April 15, 1924.
E. DE F. CURTIS
1,490,767
ELECTRICAL HEATING APPLIANCE
Filed Jan. 23, 1922
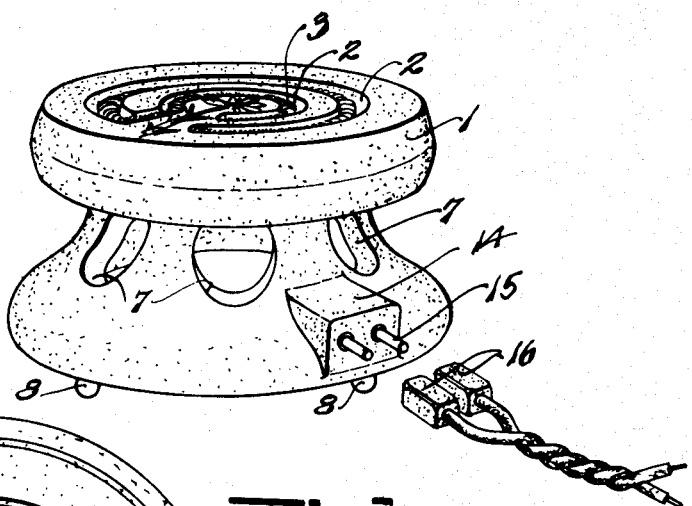
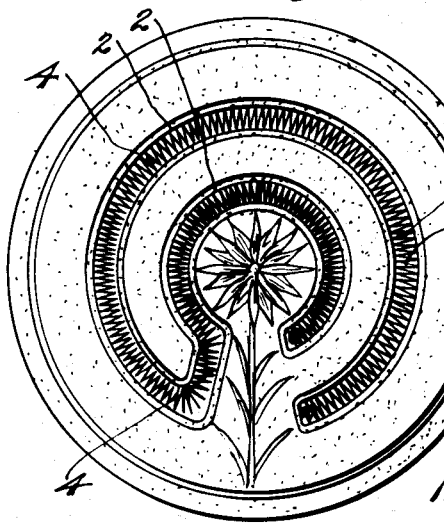
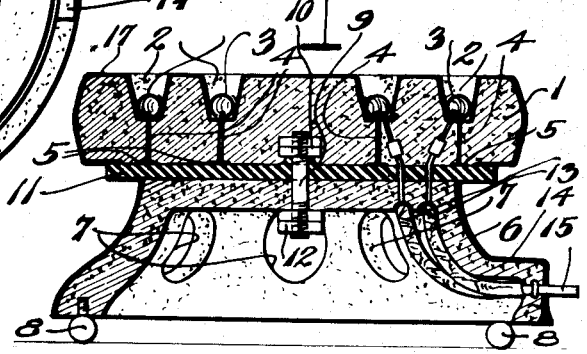
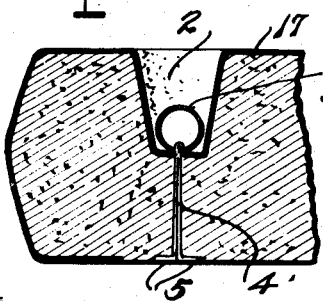
Inventor
E. de F. Curtis
Witness:
C. H. Wagner Patented Apr. 15, 1924.

1,490,767

UNITED STATES PATENT OFFICE.

EDMUND DE F. CURTIS, OF WAYNE, PENNSYLVANIA.

ELECTRICAL HEATING APPLIANCE.

Application filed January 23, 1922. Serial No. 531,241.

*To all whom it may concern:*

Be it known that I, EDMUND DE F. CURTIS, a citizen of the United States, residing at Wayne, in the county of Delaware and State of Pennsylvania, have invented certain new and useful Improvements in Electrical Heating Appliances, of which the following is a specification.

The present invention appertains to improvements in heating appliances of the class of portable articles, designed as a table adjunct for electrically heating or maintaining in heated condition dishes of food or liquids.

The primary object in view is to provide a useful support or stand carrying an electric heating element which will readily and efficiently serve the function of a small stove capable of being moved from place to place, and one which may be manufactured at a nominal cost while at the same time possessing such ornamental characteristics as will lend attractiveness to its utility rather than detract therefrom.

The novelty of the invention resides primarily in the provision of a body of refractory material capable of receiving an artistic finish, and having a seat for an electric heating element, supporting means for said body, and means for effectively insulating the support from the heat to thereby prevent likelihood of marring the object upon which the appliance may be resting.

These and such other objects as may hereinafter appear are attained by the novel construction, combination and arrangement of parts to be hereinafter specifically described and claimed.

Reference will now be had to the accompanying drawing forming a part of this specification, wherein:

Figure 1 is a perspective view of a device constructed in accordance with this invention.

Figure 2 is a top plan view thereof.

Figure 3 is a vertical sectional view through the appliance.

Figure 4 is an enlarged fragmentary sectional view showing more clearly the means for fastening the resistance unit in its seat.

Figure 5 is a detail view of the fastening means for the resistance unit.

Fig. 6 is an enlarged sectional view showing a modified means for retaining the resistance unit in its seat.

Throughout the following detailed description and on the several figures of the drawing, similar parts are referred to by like reference characters.

Referring to the drawing, it is to be understood that the electric heating device forming the subject-matter of this invention may be made of any configuration or size which is found suitable for the purposes of providing a portable heating device of this character. The invention comprises primarily the top or body portion 1 of pottery or refractory material and formed with an elongated groove or seat 2 in which is positioned the heating element or resistance unit 3. This resistance member may be held in its seat by any desired means, such as retort cement, but preferably I employ a detachable fastening such as shown in Figure 5 and designated by the reference character 4, said fastening comprising a length of wire doubled to engage with the resistance as shown clearly in Figure 4, and having its ends bent laterally as indicated at 5, the body 1 being provided, of course, with a passage through which this wire member is adapted to pass. The groove or seat 2 for the resistance unit is sufficiently deep to prevent contact of the resistance with the object which is seated upon the surface of the body for heating purposes, and I desire it to be understood that the configuration of this groove may be modified to accommodate a resistance member of greater or less length, size or arrangement.

The body 1 is supported by a base 6 which may be of similar heat-resisting material as the body and of a desired configuration to lend symmetry to the article. At spaced points openings 7 are provided through this base member so as to facilitate radiation of any heat which should be transferred thereto, and I prefer to employ spherical foot pieces 8 for the base portion, so that a minimum amount of surface contact is used. The knob-like feet 8 hold the heating appliance in spaced relation to the table or other object upon which the appliance is disposed, and naturally tend to prevent likelihood of marring the finish of the surface of said object.

The body 1 is attached to the base portion by means of a central fastening member 9 having at its upper end the lock nuts 10 which are imbedded in the body material or secured therein by retort cement as desired. Intermediate the body 1 and the base section 6 I preferably arrange an insulating plate 11 of nonconductive material of any well-known character, this member having a central aperture through which the bolt 9 is designed to pass, and the nuts 12 on the lower end of the bolt will securely and detachably fasten the various sections together to form a unit. The electric conductors 13 are attached to the appliance in any desired manner and secured to the ends of the resistance unit 3, said conductors preferably extending through a projection or boss 14 on the base which is provided in the molding of the latter, the conductors extending outwardly a sufficient distance to form terminal posts as indicated at 15 to receive the current supply terminals 16. The outer surface of the refractory material of this appliance is designed to receive a glazed finish of any desired color, as indicated at 17, and any other ornamentality or design to provide an artistic appliance of this character.

In Figure 6 I have shown a modified method of securing the resistance unit in its groove against displacement therefrom, consisting in the provision of a bridge 18, but as hereinbefore premised I prefer to employ the fastening means 4 arranged at suitable intervals as shown in Figure 2.

It will be apparent that the article hereinbefore described may be very cheaply manufactured and assembled yet possess the same utility and effectiveness as many of the expensive metallic portable heating devices which are well known.

Having thus described my invention, what I claim as new and desire to secure by Letters Patent is:

1. A heating appliance of the class described comprising a body of refractory material having an elongated groove therein, a heating unit seated in said groove, a raised base for said body, electrical insulating means intermediate said base and body, and means for securing said body and insulating means to the base.

2. A portable electric heating device of the class described comprising a body section having a groove in its upper face, a resistance element disposed in said groove, retaining means for said element extending through the body, an insulated base unit for supporting said body upon its upper face, and means for detachably securing the body to said base.

3. A portable electric heating device of the class described comprising a body of refractory material capable of receiving an artistic finish and having a groove therein, a resistance element in said groove, fastening members engaging said resistance element at spaced intervals and passing through the body to hold said element in the groove, a detachable base for said body provided with openings therein, an insulating member intermediate the resistance fastening members of the body and said base, and fastening means for securing the body and insulating member to the base.

In testimony whereof I affix my signature.

EDMUND DE F. CURTIS.